United States Patent [19]

Sundholm

[11] Patent Number: 5,014,601
[45] Date of Patent: May 14, 1991

[54] WORKING CYLINDER

[76] Inventor: Göran Sundholm, Magistervägen 34 B, SF-02700 Grankulla, Finland

[21] Appl. No.: 364,625

[22] Filed: Jun. 9, 1989

[30] Foreign Application Priority Data

| Jun. 15, 1988 | [FI] | Finland | 882857 |
| Jul. 18, 1988 | [FI] | Finland | 883410 |
| Nov. 16, 1988 | [FI] | Finland | 885307 |
| Feb. 3, 1989 | [FI] | Finland | 890518 |
| Apr. 4, 1989 | [FI] | Finland | 891612 |

[51] Int. Cl.$^5$ ............................................. F01B 31/00
[52] U.S. Cl. ................................... 92/109; 92/169.1; 92/171.1; 92/168; 29/511; 29/516; 29/888.04; 29/888.061; 285/382.2
[58] Field of Search ............. 92/169.1, 171.1, 165, 92/168, 109; 29/156.5 R, 156.4 R, 156.4 WL, 509, 510, 511, 515, 516, 517; 285/382.2, 382.1, 382 R, 382.7

[56] References Cited

U.S. PATENT DOCUMENTS

| 2,974,636 | 3/1961 | Farmer | 92/109 |
| 3,848,325 | 11/1974 | Bimba | 29/511 |
| 4,233,887 | 11/1980 | Stoll | 92/171.1 |
| 4,334,703 | 6/1982 | Arthur et al. | 285/382.2 |
| 4,480,730 | 11/1984 | Koller et al. | 29/511 |
| 4,783,897 | 11/1988 | Basnett | 29/516 |
| 4,813,236 | 3/1989 | Reynolds | 92/171.1 |

FOREIGN PATENT DOCUMENTS 953513 12/1949 France ........................ 92/109

*Primary Examiner*—Edward K. Look
*Assistant Examiner*—Thomas Denion
*Attorney, Agent, or Firm*—Ladas & Parry

[57] ABSTRACT

The invention relates to a working cylinder comprising a cylinder unit with a front end part, a rear end part and a cylinder tube connecting these end parts, a piston movable in the cylinder tube and a piston rod secured to the piston and extending through the front end part. The purpose is to provide a novel, simple solution for securing the cylinder tube to the end parts. Each end part has a shoulder, the cylinder tube being connected to each end part by means of a compression ring which upon deformation of the end of the cylinder tube and by means of said end tightly clamps the end shoulder.

15 Claims, 10 Drawing Sheets

WORKING CYLINDER

The present invention relates to a working cylinder, comprising a cylinder unit having a front end part, a rear end part and a cylinder tube connecting the front and rear end parts, a piston movable in the cylinder tube and a piston rod secured to the piston and extending through the front end part.

In known working cylinders, especially in hydraulic cylinders, the cylinder tube of the cylinder unit is usually secured to the rear end part by means of a welded joint and to the front end part by means of a threaded connection. Welding entails the disadvantage that the cylinder tube in the vicinity of the welded joint loses its interior circular cross-section which must subsequently be restored by machining the inner surface. On the other hand, the threaded connection to the front end part requires the provision of an interior thread on the cylinder tube, and the forming of this thread is laborious and expensive. The thread must be relatively deep, and this results in a material weakening such that the cylinder tube must often be made thicker than the working pressure of the cylinder as such would require. These disadvantages are increased by the fact that the desired stroke length of the working cylinder, and thereby the length of the cylinder tube, varies greatly in accordance with the intended use; thus in view of the length of the cylinder large production series are rarely possible.

The object of the present invention is to provide a novel working cylinder eliminating the above stated disadvantages.

The working cylinder of the invention is mainly characterized in that at least one of said front and rear end parts includes a shoulder which bears against the inner surface of an overlying respective end portion of the cylinder tube and at least one compression ring having been compressed around the respective end portion of the cylinder tube thereby to clamp the cylinder tube to the respective at least one end part, the or each compression ring being provided with a flange which is shaped whereby during the said compression of the compression ring the cylinder tube end portion is deformed by the flange and the deformed cylinder tube end portion is clamped between the flange and the shoulder.

In comparison with the previously used welding or threading, the clamping of the ends of the cylinder tube by means of compression rings, in accordance with the invention, is considerably easier to realize. The cylinder tube is cut to the desired length, and the ends of the tube are clamped between the cylinder ends and the compression rings. Standard compression tools which can be used without actual professional skill are available on the market at a low price.

The compression rings are preferably made of steel. The compression operation is to be done rather slowly, so that the ring material is capable of even deformation in a flowing manner without breaking; as the diameter of the compression ring is decreasing, the axial dimension of the compression ring is increasing.

In a preferred embodiment of the invention each cylinder end part of the cylinder unit have a stop for abutment against a respective edge of the respective compression ring, for the elimination of axial displacement of the cylinder tube when the compression ring is fitted on. A radially inner portion of said stops is preferably bevelled towards the respective end portion of the cylinder tube, and the edge of the compression ring has, correspondingly, a bevelled surface cooperating with the bevelled portion of the respective stop.

This preferred embodiment enables a secure connection between the cylinder tube and the respective end part. The edge of the compression ring will be somewhat deformed during the compression of the ring and will be tightly wedged in between the cylinder end part stop and the end of the cylinder tube.

The shoulder of each cylinder end part has preferably a sharp edge over which the interior surface of the cylinder tube is deformed.

If the compression ring is compressed in one single step there will afterwards, due to the elasticity of the compression ring material, be formed a very small, but still a play between the end part stop and the compression ring. Even if this axial play is as small as about 1/100 mm there remains a risk for the play to gradually widen during the regular operation of the working cylinder, thereby eventually causing disturbances. In order to achieve a completely play-free connection between the cylinder tube and the respective cylinder end part, it is suggested to compress the compression ring in two steps in such a manner that that part of the compression ring, which radially surrounds the cylinder tube at the shoulder of the cylinder end part, is compressed in a first step, and thereafter the edge of the ring is compressed in a second step. The edge is such a small part of the compression ring that no play will occure due to the elasticity of the flange material. In this way it is, in addition, possible to ensure that a cylinder tube does not at all glide in relation to the shoulder of the cylinder end part.

The present invention concerns this mounting method as well.

The same general principle is preferably applied also to the piston rod of the working cylinder. The piston rod is then made as a tube with an insert part fitted into each end of the piston rod, said insert parts being provided with a shoulder in the same way as earlier described for the cylinder end parts. The piston is secured to the piston rod by means of a deformable end portion, serving as a compression ring. The deformable end portion of the piston, acting as a compression ring, is preferably provided with gripping means, such as teeth, a thread or the like at its interior surface in order to improve the clamping effect. Alternatively, the exterior surface of the insert piece, abutting the interior surface of the piston rod tube, may be provided with similar gripping means. Such additional clamping arrangements are recommended, because the piston rod is subject to very heavy axial loads during the regular operation of the working cylinder.

The following is a more detailed description of the invention with reference to the accompanying drawing which, by way of example, shows a preferred embodiment.

FIGS. 23 to 26 show a preferred way of interconnecting the piston and the piston rod.

FIGS. 27 to 30 show a preferred way of connecting the front end of the piston rod to a connection piece.

FIGS. 31 to 33 illustrate additional aspects when connecting the cylinder tube to an end part of the cylinder unit.

Figure 1:
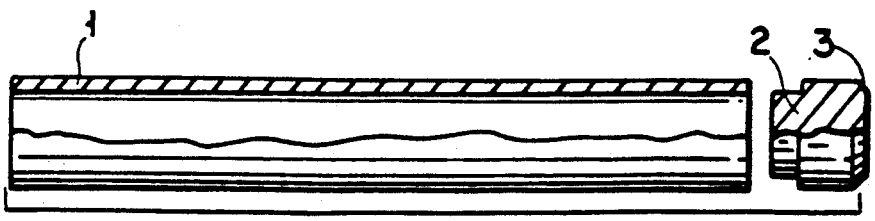
FIGS. 1 to 6 show the mounting of the piston rod of the working cylinder, in general.
Figure 2:
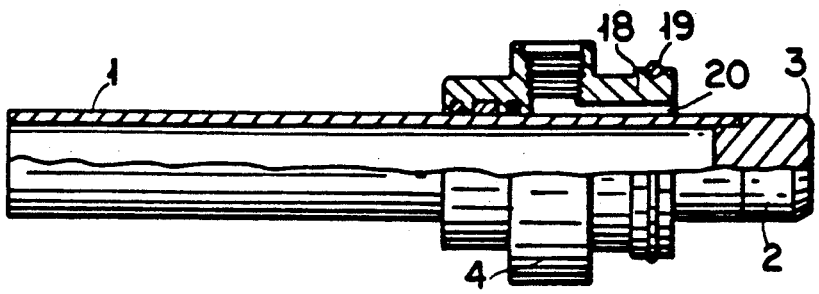
Figure 3:
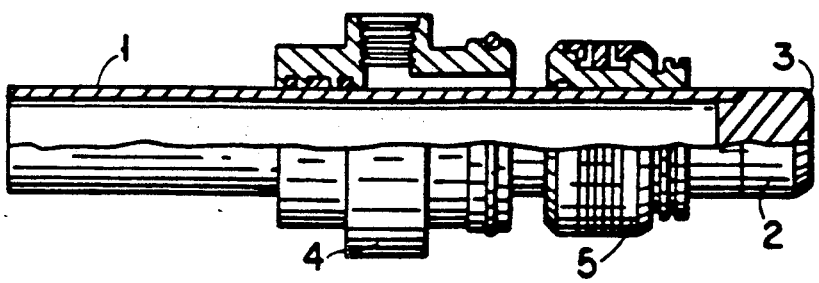
Figure 4:
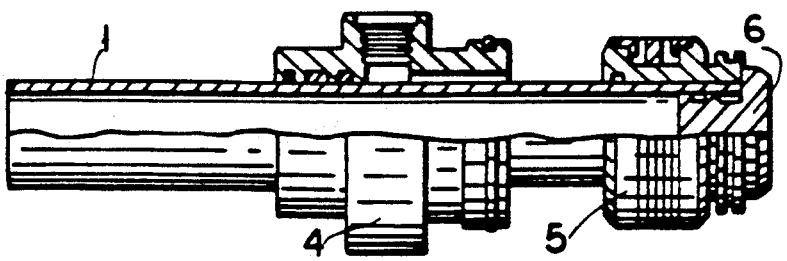
Figure 5:
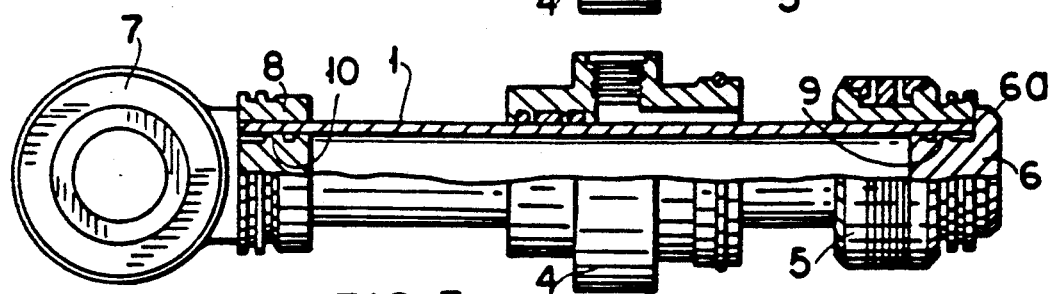
Figure 6:
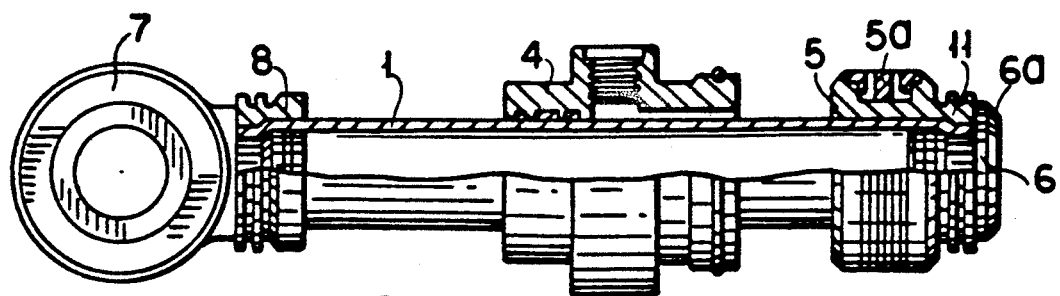
Figure 7:
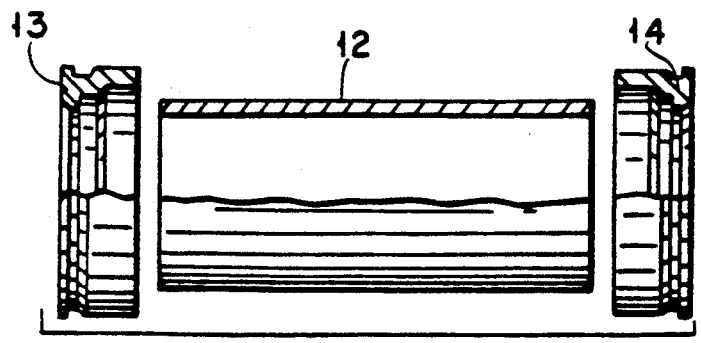
FIGS. 7 to 10 show the final assembly of the working cylinder, in general.
Figure 8:
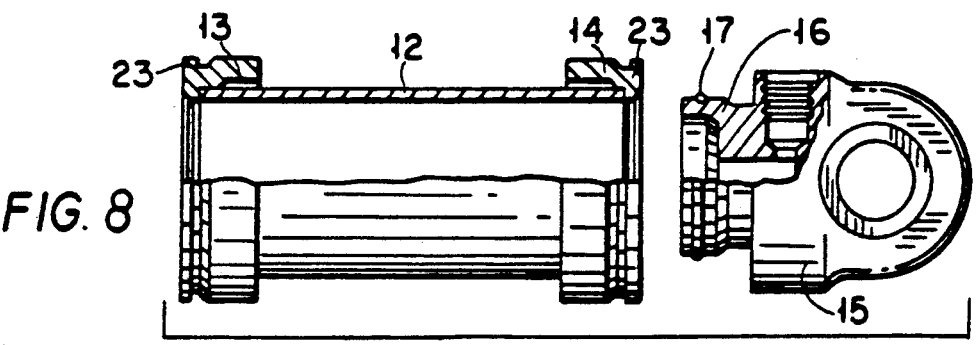

In FIGS. 1 to 10, reference numeral 4 denotes a front end part of a cylinder unit of the working cylinder, 15 denotes a rear end part, 12 denotes a cylinder tube connecting the end parts 4 and 15, 5 denotes a cylinder piston movable in the tube 12, 1 denotes a piston rod secured to the piston 5, 31 and 32 denote inlets for the pressure fluid for the desired displacement of the piston 5, together with the piston rod 1, in the desired direction within the tube 12.

An essential novelty lies in the way in which the tube 12 is connected to the end parts 4 and 15. In distinction to the previously used welded and threaded connections, each end part is provided with a preferably circumferential shoulder, 18 and 16, and the tube 12 is arranged to be retained in place by means of compression rings 13 and 14 which grip the shoulders 18 and 16 by means of a flange 23 and upon compression clamp the respective end portions of the tube 12 over the respective end shoulders 18 and 16. This mounting procedure will be described in more detail later on with reference to FIGS. 11 to 14, 17 to 22, and 31 to 33.

The tube 12 can simply be cut to the required length, without any need for finish or other treatment of the ends. Compression rings having the required inner configuration are likewise economical to manufacture, tools for compressing the rings 13 and 14 are also readily available in the market and are easy to use.

A sealing ring 19, 17 is preferably disposed between the tube 12 and the guiding surfaces of the end shoulders 18 and 16 which face the cylinder space.

The following is a general description of a preferable method of mounting the working cylinder according to the invention.

One suitably starts with the piston rod, preferably a metal tube 1 cut to the desired length. A plug 2 having a bevelled end 3 is fitted to one end of the tube 1, whereafter the front end part 4 of the cylinder is brought onto the tube 1. The exterior surface of the plug 2 coincides with the exterior surface of the tube 1, the bevelling 3 compresses the seals of the end part 4 bearing on the tube 1 gently without damaging said seals. Similarly, the piston 5 is fitted onto the piston rod 1, FIG. 3.

The plug 2 is removed and replaced by an insert piece 6 having an end flange 6a bearing on the coinciding ends of the tube 1 and piston 5, and having an inner shoulder 9 abutting against the interior surface of the tube 1. The piston 5 comprises a deformable end portion 11 which upon compression clamps the end portion of the tube 1 over the shoulder 9 of the insert piece 6. Correspondingly, a connecting piece 7, comprising an insert part similar to the insert 6, is fitted to the front end of the piston rod 1 by means of a compression ring 8 which clamps the end portion of the tube 1 over a shoulder 10 of the insert part of the connecting piece 7 which bears on the interior of the tube 1, FIGS. 5 and 6.

The cylinder wall interconnecting the end parts of the working cylinder is constituted by a metal tube 12 cut to the desired length. Compression rings 13 and 14 with an edge flange 23 are fitted onto the ends of the tube 12, the outer end of said edge flange being inwardly bevelled and preferably extending so as to coincide with the interior surface of the tube 12. On account of the bevelling of the edge flange 23, denoted by reference numeral 25 in FIGS. 11 and 12, the piston rod 1 with piston 5 and the front end part 4 can be pushed into the tube 12 without damaging the seal 5a (FIGS. 6 and 9) of the piston 5 and the seal 19 (FIG. 2) of the front end part 4 which bear on the interior of the tube 12. The same applies to the seal 17 (FIG. 8) of the rear end part 15.

Figure 9:
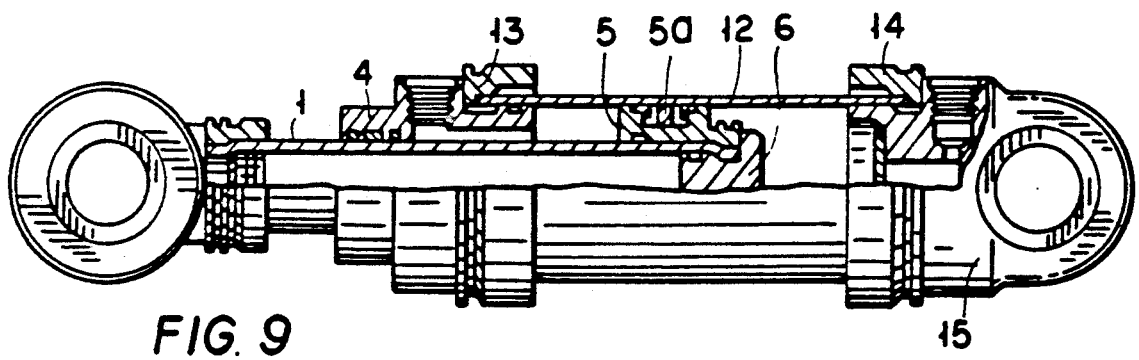
Figure 10:
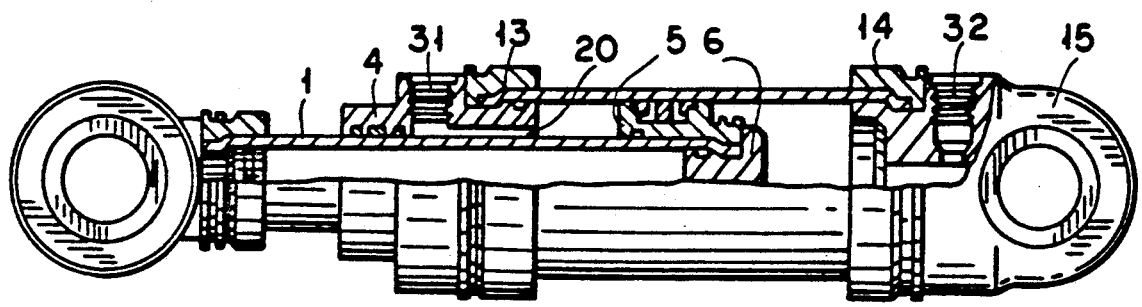
Figure 11:
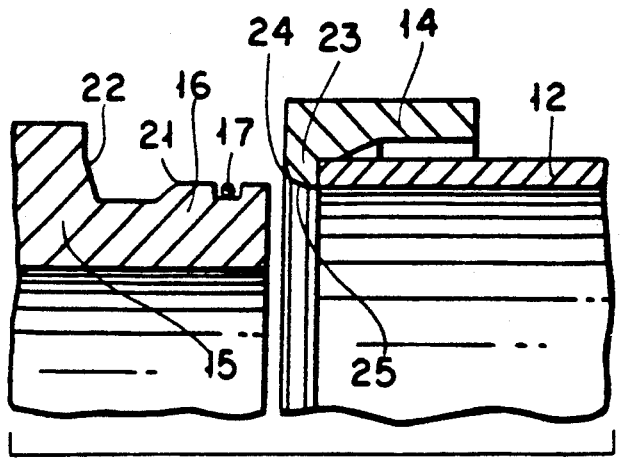
FIGS. 11 to 14 show the connection of the cylinder tube to an end part of the cylinder unit.
Figure 12:
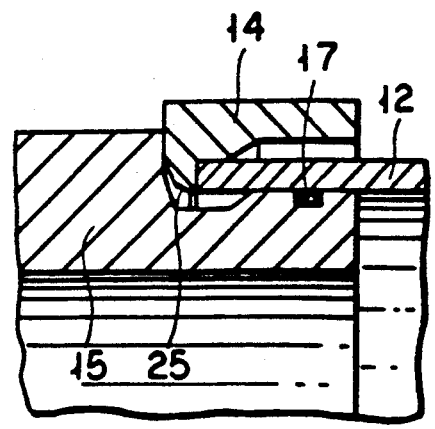
Figure 13:
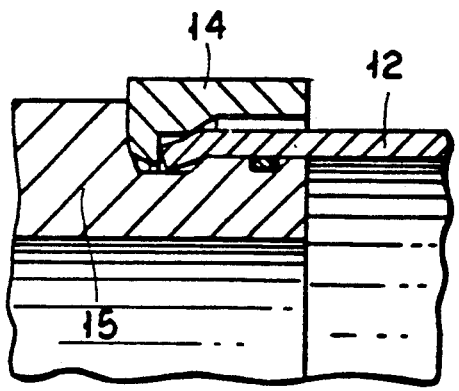
Figure 14:
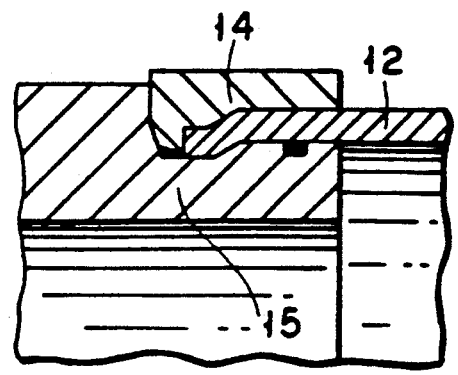

During the compression of the ring 13, the piston 5 is preferably retained close to the front end part 4 (FIG. 9). The material of the end part 4 tends to yield somewhat when compressing the ring 13, wherefore the inlet 31 is preferably connected with the cylinder space delimited by the tube 12 and piston 5 through an annular duct 20 between the piston rod 1 and the end part 4 (FIG. 10). The seal required between the end part 4 and the piston rod 1 is laid outwards toward the end of the piston rod 1.

FIGS. 11 to 14 show one preferred embodiment for connecting the cylinder tube to an end part of the cylinder unit, in this case the rear end part 15.

Figure 15:
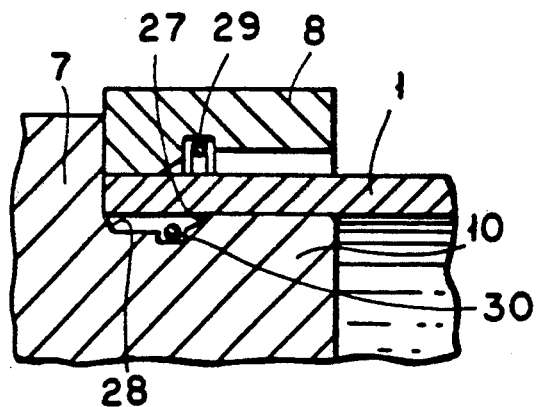
FIGS. 15 and 16 show, in a corresponding manner, the mounting of the outer end of the piston rod to a connecting piece.
Figure 16:
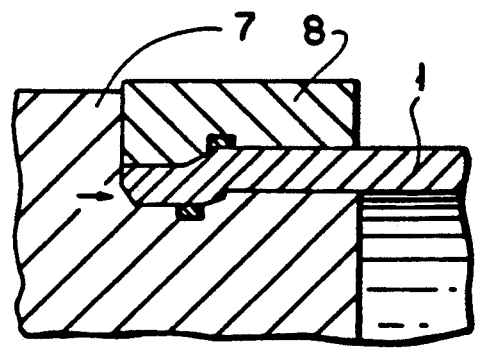

The shoulder 16 of the end part 15 has a preferably sharp edge 21, in addition to which the end part has a stop for abutment against the edge flange 23 of the compression ring 14. The radially inner portion 22 of the stop is bevelled towards the end of the tube 12. The edge flange 23 of the compression ring 14 has a corresponding bevelled surface 24. On account of the cooperating surfaces 22 and 24, it is achieved, upon compression of the ring 14, that the edge flange 23 trails the end of the tube 12 actively and with great axial power so that the edge 21 cuts into the tube wall. The same principle can be applied, somewhat simplified, to the piston 5 and the connecting piece 7 at 11 and 8 respectively, as is shown in FIGS. 15 and 16. In that case, the edge flange of the ring 8 need not lie against the end of the tube 1 to guide it but a bevelled stop face 28 is sufficient. The cutting edge of the shoulder 10 is denoted 27, two sealing rings are denoted 29 and 30.

In the embodiment according to the FIGS. 11 to 14, the ring 14 is supposed to be compressed in one step. Apart from the fact that there is a certain risk for the tube 12 to, in spite of the sharp edge 21, slightly glide over the shoulder 16, there is a tendency to be formed a very small, but still an axial play between the stop of the end part 15 and the edge flange 23 of the compression ring 14, in spite of the cooperating bevelled surfaces 22 and 24. This is due to the fact that the compression ring 14, after completed compression, slightly contracts axially because of the elasticity of the ring material. This play, although initially extremely small, may eventually widen and cause disturbance in the operation.

Figure 31:
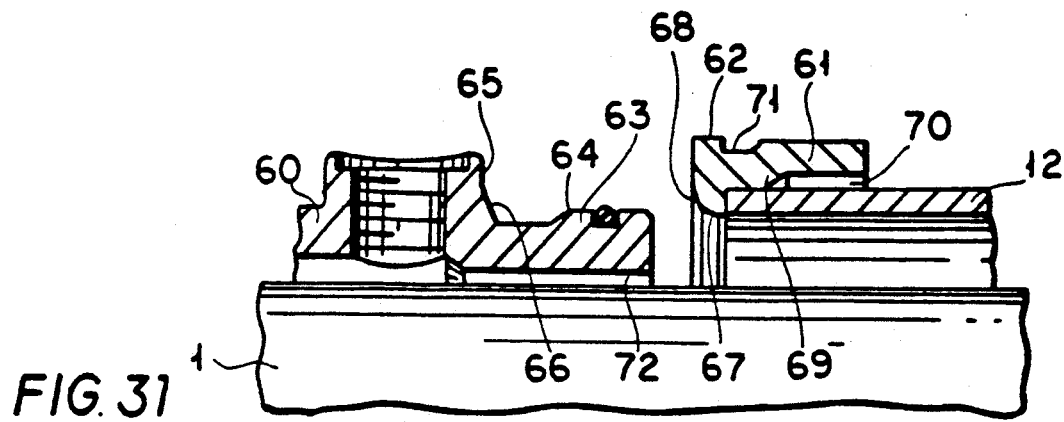
Figure 32:
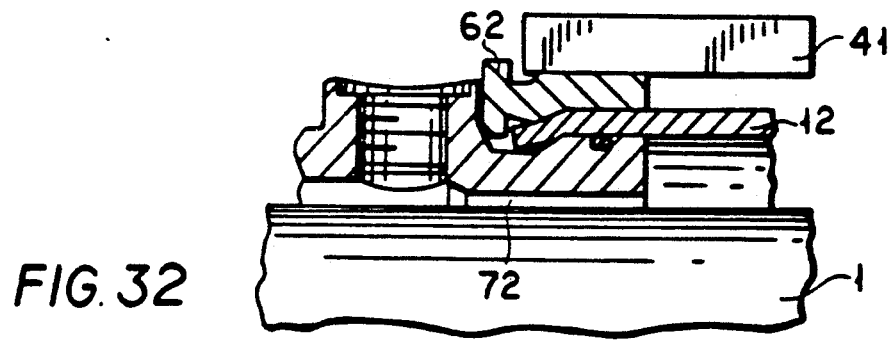
Figure 33:
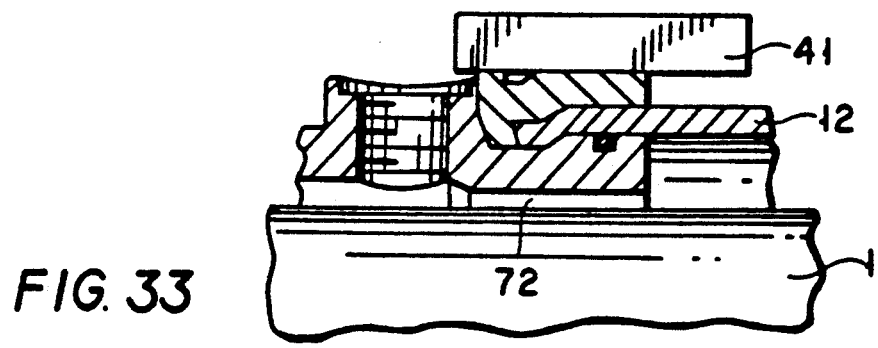

FIGS. 31 to 33 illustarate a preferred way of compressing the compression ring in order to achieve a connection without an axial play between the abutting surfaces of the axial stop of the end part and the edge flange of the compression ring.

Reference numeral 1 indicate a piston rod, 12 indicate a cylinder tube, 41 indicate a compression tool, 60 indicates a cylinder end part and 61 indicates a compression ring with an edge flange 62. The cylinder end part 60 has a circumferential shoulder 63 with an edge 64 towards a stop 65 for abutment against the edge flange 62 of the compression ring 61. The radially inner portion 66 of the stop 65 is bevelled towards the compression ring 61 the end surface of which has a bevelled portion 68 for cooperation with the bevelled portion 66 of the stop 65, as will be described hereafter. The radially innermost portion 67 of the edge flange 62 is further bevelled to facilitate mounting of the compression ring 61 and the cylinder tube 12 on the cylinder end part 60 without damaging the seal visible to the right of the reference line 63. 69 indicates an interior shoulder of the compression ring 61 for cooperation with the shoulder 63 of the cylinder end part 60, 70 indicates an annular gap between the cylinder tube 12 and the compression ring 61 prior to the compression of the latter, 71 indicates an annular recess limiting the edge flange 62, and 72 indicates an annular gap between the piston rod 1 and the shoulder portion of the cylinder end part 60.

The compression ring 61 is compressed in two steps. At first that part of the ring 61 which radially lies around the tube 12 is compressed until the gap 70 is closed so that the inner shoulder 69 of the ring 61 bends the tube end about the edge 64 of the shoulder 63 of the cylinder end part 60, as shown in FIG. 32, and in a second step thereafter, the edge flange 62 of the ring 61 is compressed, with the surfaces 66 and 68 in tight gliding relation, into the finally assembled position shown in FIG. 33. The elasticity of the edge flange material alone is of such a small order that no play will appear between the edge flange 62 and the stop 65, 66 of the end part 60.

The purpose of the annular recess 71 is mainly to facilitate the positioning of the compression tool 41 in the first compression step. Compression in two steps may preferably be used as well for such embodiments, not shown in the drawing, which are without cooperating bevelled surfaces like 66 and 68 in FIGS. 31 to 33, as e.g. by the piston rod connections shown in FIGS. 15 and 16, or even without a cylinder end part stop like 65.

FIGS. 17 to 22 are intended to further illustrate the procedure just described with reference to FIGS. 31 to 33.

Figure 17:
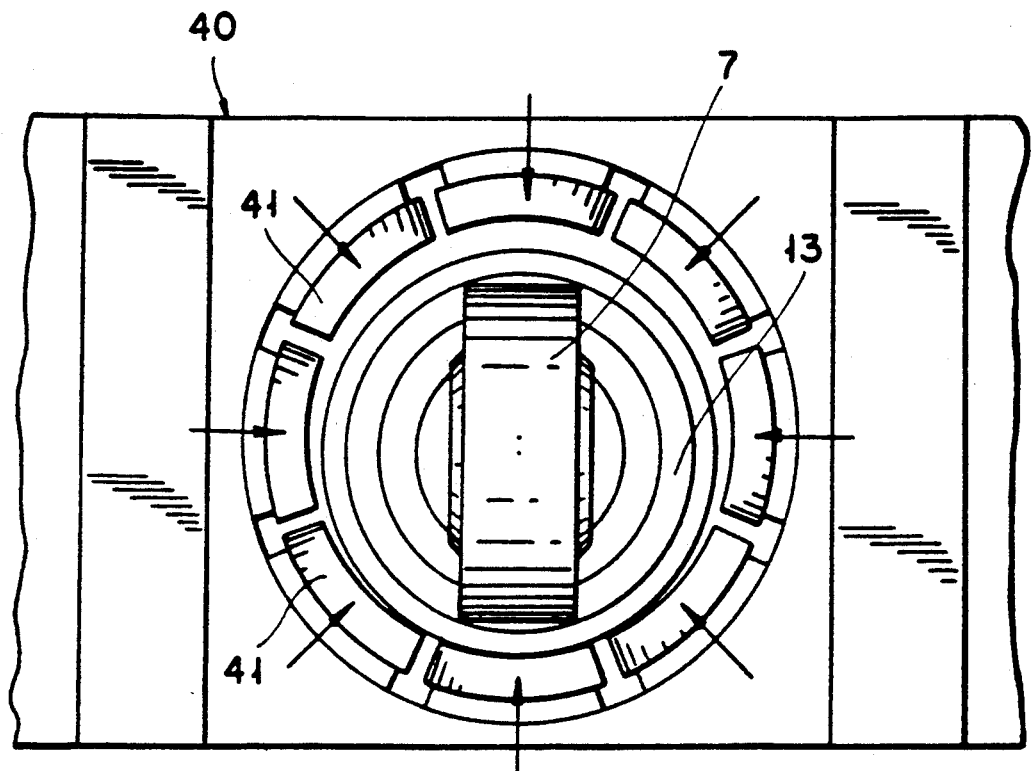
FIGS. 17 to 32 show a preferred way of connecting the cylinder tube to an end part of the cylinder unit.
Figure 18:
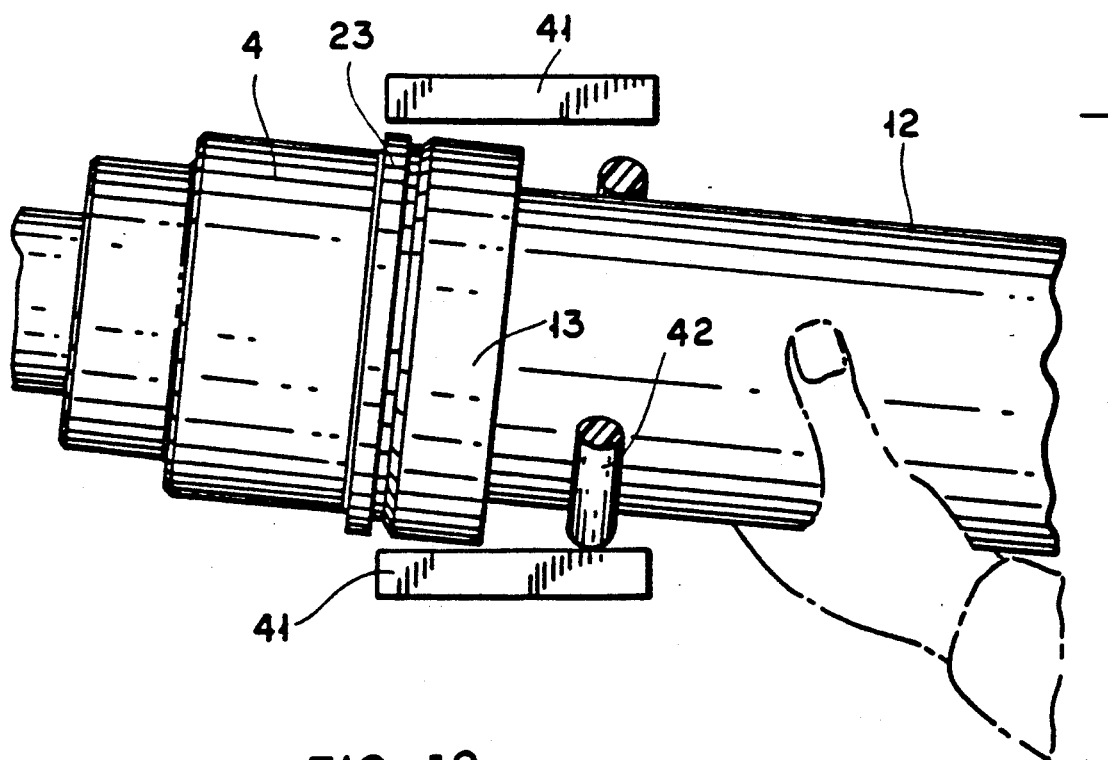

FIG. 17 is a view of a compression tool, generally designated 40, and a working cylinder, as seen from the end of the piston rod before compression of the ring 13. The compression tool 40 may be a hydraulically operated standard hose swaging machine with a number of circumferentially arranged compression jaws 41 movable from the open position of FIG. 17 in the directions of the arrows.

Figure 19:
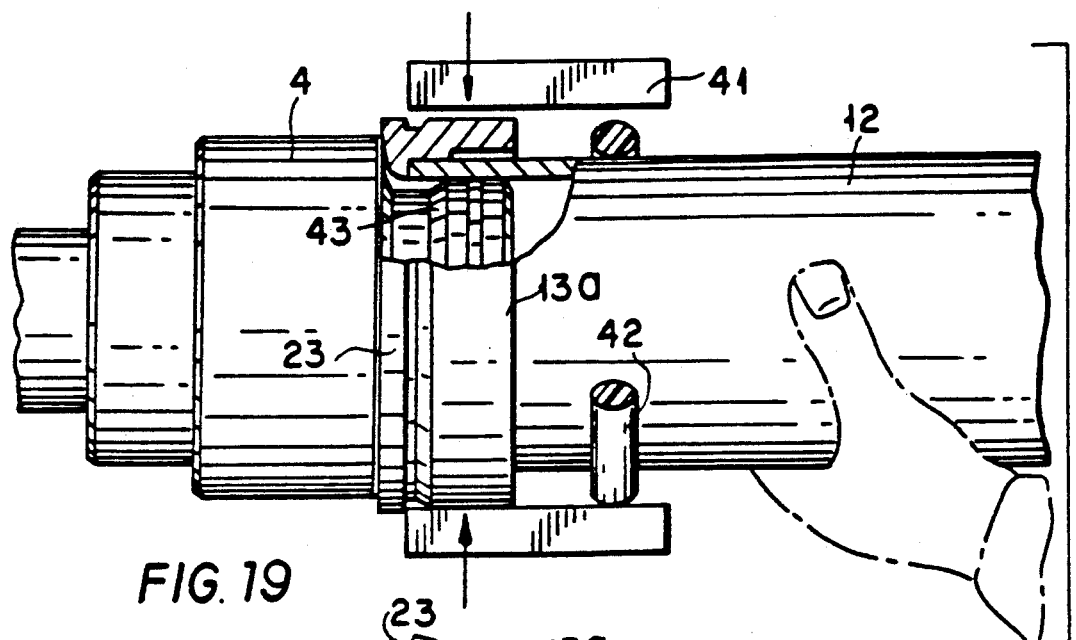
Figure 21:
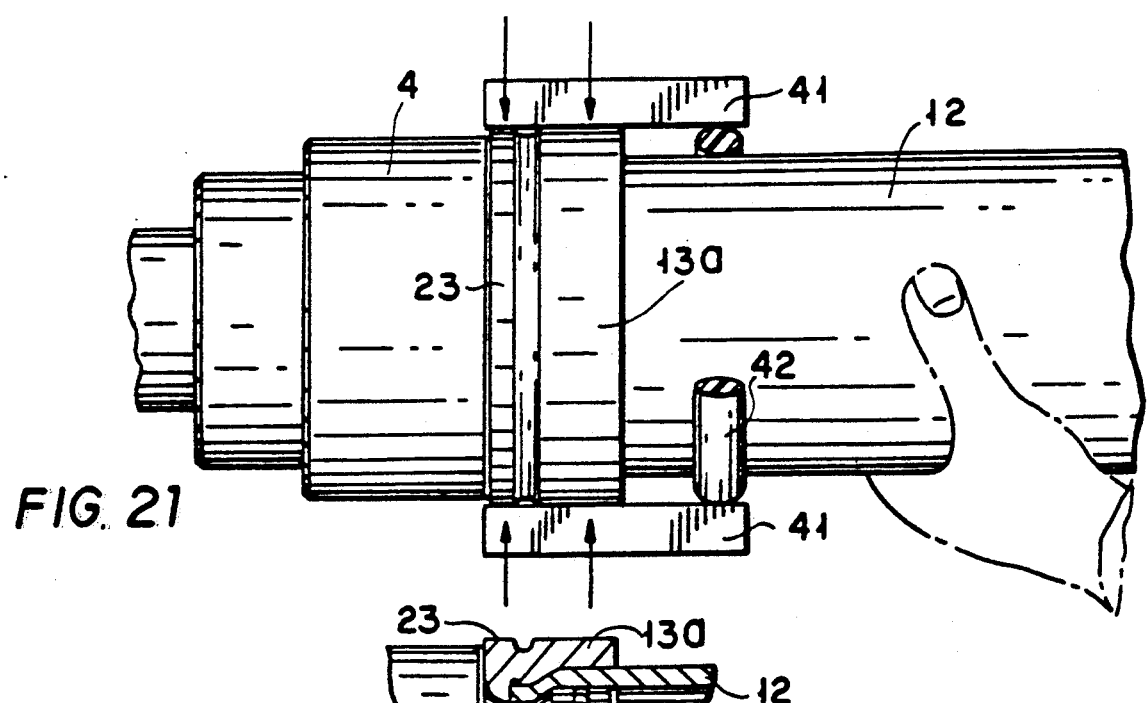

Although a standard operation as such, should be taken that the position of the assembly is in accurate alignment with the compression jaws 41. In order to correct an initial misalignment, exaggerated in FIG. 18, an elastic ring 42, with a thickness at least essentially the same as that of the compression ring 13, is preferably positioned around the cylinder tube 12 at a distance from the ring 13 within reach for the compression jaws 41. As shown in FIGS. 19 and 21, the ring 42 ensures correct alignment.

Figure 20:
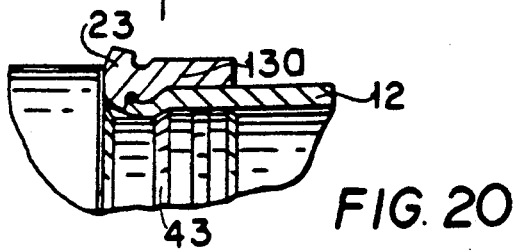
Figure 22:
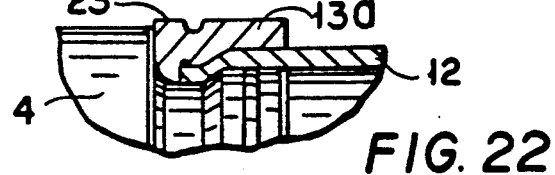
Figure 23:
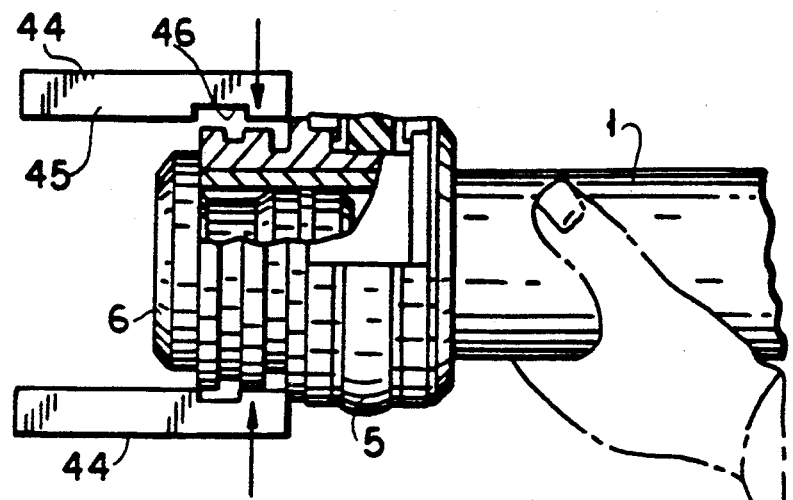
Figure 24:
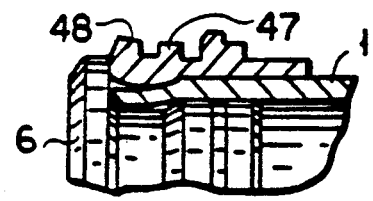

FIG. 20 shows the encircled part of FIG. 19 after the first compression stop when the portion 13a of the ring has been compressed over the shoulder 43, the edge flange 23 being arreted by the abutting step of the cylinder end part 4. FIGS. 21 and 22 show the second compression step, FIG. 22 showing in section the encircled part of FIG. 21.

FIGS. 23 to 26 show an example of joining the piston 5 to the piston rod 1 by compressing the deformable end portion 47, 48 of the piston and respective end of the piston rod 1, constituted by a tube, around a shoulder provided on an insert piece 6 inside the end of the piston rod.

In this case the compression jaws 44 have a recess 46 adjacent one edge, with thicker portions 45 on each side. In the first compression step, the jaws 44 engage an inner annular protrusion 47 overlying the shoulder of the insert 6 whereas an outer annular protrusion 48 is received by the recess 46 as arreted by friction against the axially abutting end portion of the insert 6.

Figure 25:
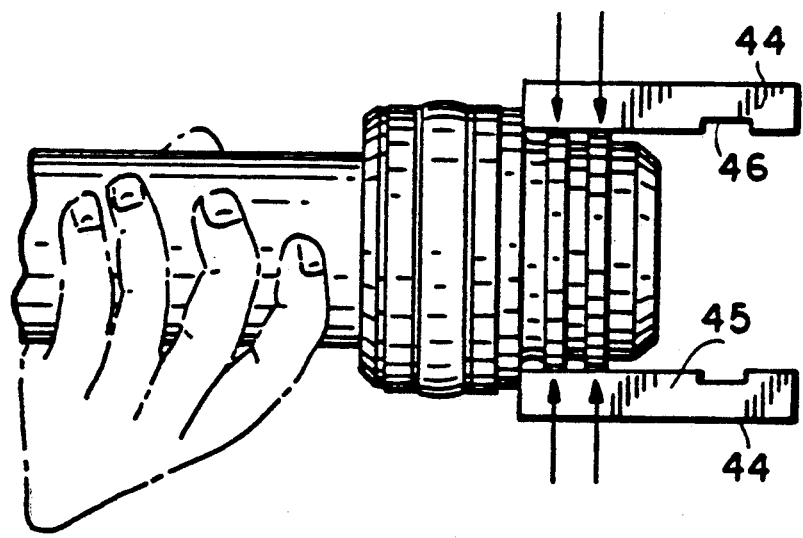
Figure 26:
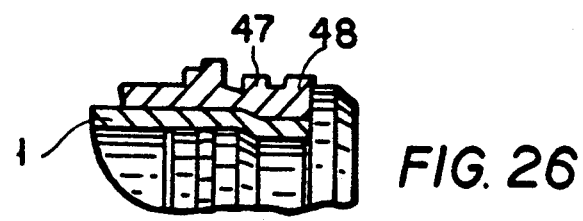

In the second compression step, the assembly is shifted to the other side of the compression jaws 44, as shown in FIG. 25, and the outer annular protrusion 48 are engaged by the jaws.

It should be noted that the (edge)/flange referred to earlier and later in the claims here is formed during the compression steps; the compression rings, e.g. 13-14 and 61, for joining the cylinder tube 12 to the respective cylinder end parts, may be of a similar configuration i.e. without initial (edge) flange.

FIGS. 27 to 30 show a preferred embodiment for joining the part end of the piston rod 1, made as a tube, to a connecting element 7 for transferring the movement of the piston rod to further actuating means not shown.

The connecting element 7 comprises an insert portion in general similar to the earlier described insert piece 6, with a shoulder 10 abutting the interior surface of the piston rod 1. The compression ring is of the same general configuration as the deformable end portion of the piston 5, as in FIGS. 23 to 26, with an inner annular protrusion 49 and an outer annular protrusion 50.

Figure 27:
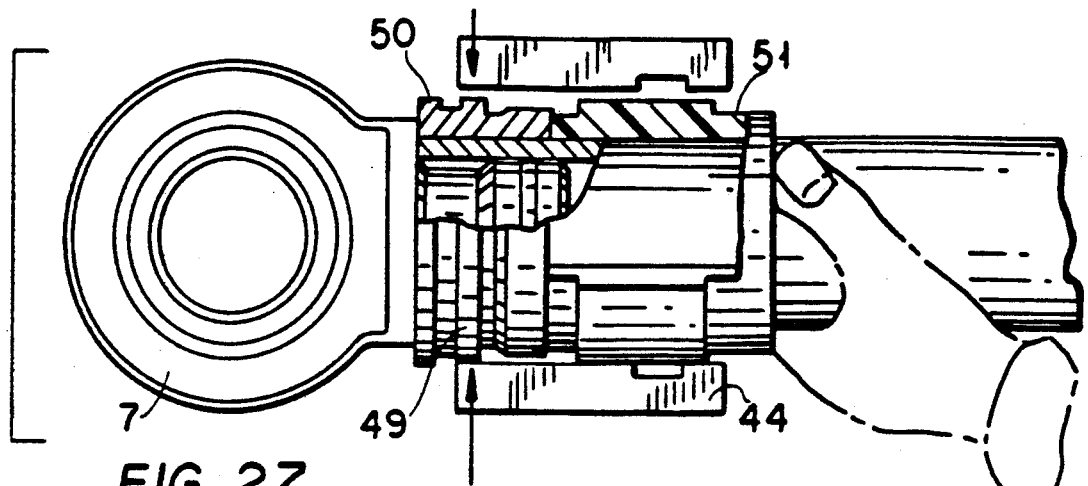
Figure 28:
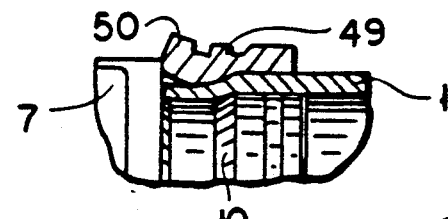
Figure 29:
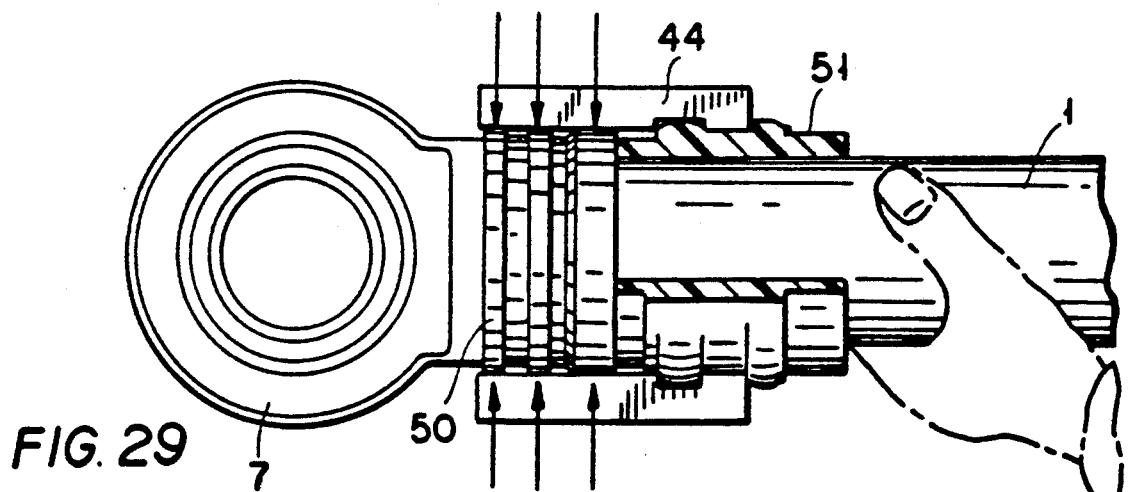
Figure 30:
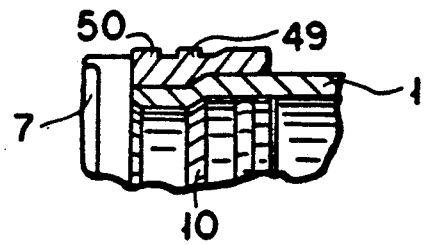

As is seen from FIGS. 28 and 30, showing the encircled portions of FIGS. 27 and 29, the compression steps are similar to those of FIGS. 23 to 26. Numeral 51 indicates an elastic or yielding ring element for the same purpose as the one designated 42 in FIGS. 18, 19 and 21. A type of compression ring according to FIGS. 27 to 30 can be contemplated instead of the earlier described rings 13, 14 and 61.

Figure 34:
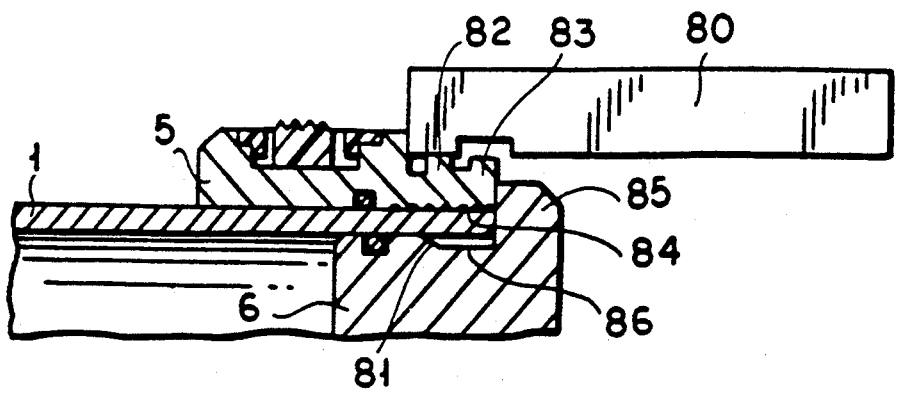
FIGS. 34 to 36 show a preferred embodiment for interconnecting the piston and the piston rod.
Figure 35:
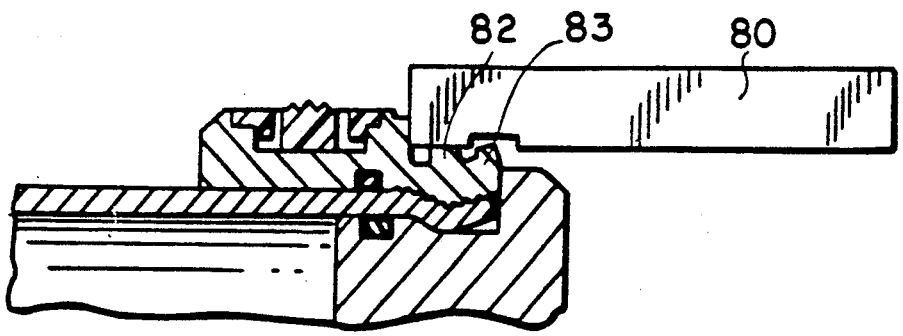
Figure 36:
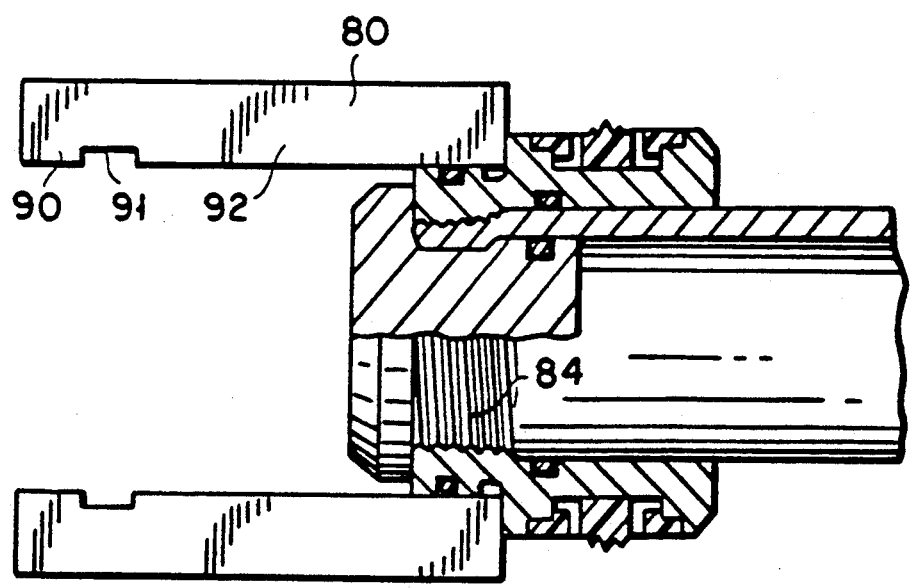
Figure 37:
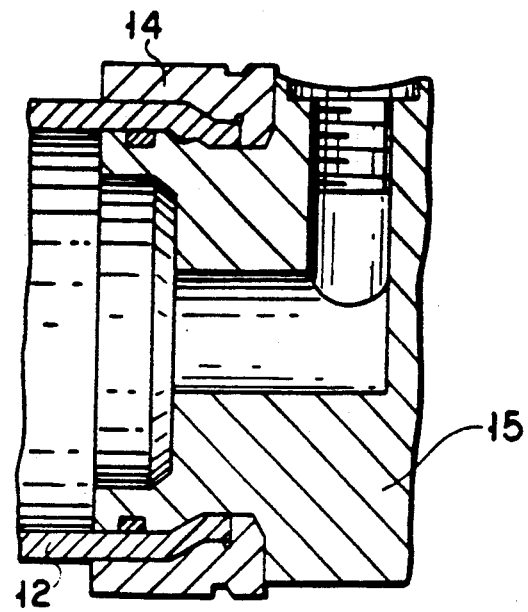
FIGS. 37 to 40 show a preferred embodiment for preventing the cylinder tube from turning in relation to the end parts.

FIGS. 34 to 36 show a preferred embodiment for joining a piston rod tube 1 to a piston 5. The procedure is similar to the one described earlier with reference to FIGS. 23 to 26.

A compression tool 80 engages in a first compression step, by means of an end portion 90, an inner annular protrusion 82 of a deformable end portion of the piston 5 and bends that portion and the underlying portion of the piston rod 1 over a shoulder 81 of an insert piece 6, an outer annular protrusion 83 being received by a recess 83 adjacent the end portion 90 of the compression tool 80 as that respective part of the deformable end portion of the piston is arreted by friction against an axial stop 85 of the insert piece 6, FIG. 35.

In a second compression step, the opposite end portion 92 of the compression tool 80 engages the outer annular protrusion 83 and completes the compression of the deformable end portion of the piston 5, FIG. 36.

During the regular operation of the working cylinder, the joint of the piston 5 to the piston rod 1 is subject to great axial forces, often in combination with vibrations. In order to further secure the joint, it is suggested to provide the interior surface of the deformable end portion of the piston 5 with spaced gripping means, e.g. same kind of treth or, as indicated in FIGS. 34 to 36, a thread, 84, for biting into the abutting surface of the piston rod tube 1. Such gripping means may, in addition or alternatively, be provided in the corresponding exterior surface of the insert piece 6, as indicated by reference numeral 86.

Figure 38:
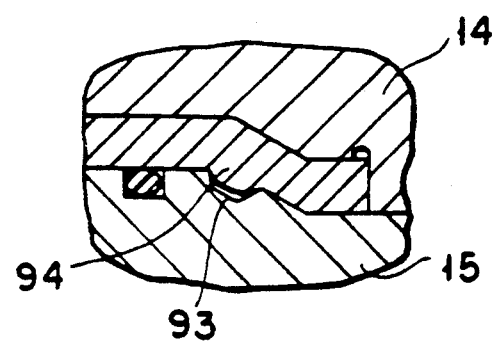
Figure 39:
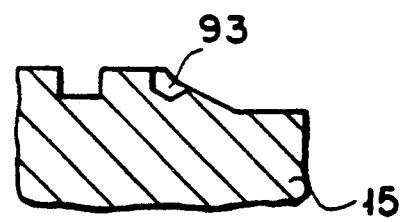
Figure 40:
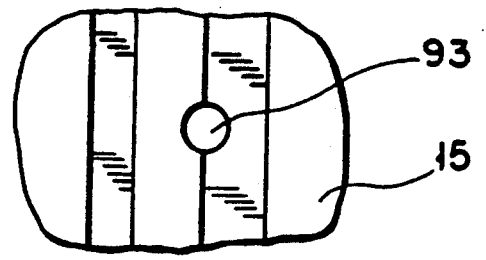

FIGS. 37 to 40 show an embodiment for preventing the cylinder tube 12 from turning with respect to a respective cylinder end portion 15. FIG. 38 shows the encircled part of FIG. 37, FIGS. 39 and 40 the respective portion of the cylinder end part 15 alone, as seen from the side and from above.

That surface of the cylinder end part 15 which internally abuts the deformed end portion of the cylinder tube 12 is provided with at least one recess 93 into which tube material 94 is forced when the end portion of the tube 12 is deformed. The at least one recess 93 may, as indicated in FIGS. 37 to 40, be provided at the shoulder edge of the cylinder end part 15 or elsewhere, prefereably then behind the shoulder, to the right in the figures. Alternatively, a similar recess may be provided in the interio surface of the compression ring 14, or the engaging surface of the cylinder end part 15 or the interior surface of the compression ring 14 may have at least one local protrusion forced into the material of the end portion of the cylinder tube 12.

I claim:

1. A working cylinder, comprising a cylinder unit having a front end part, a rear end part and cylinder tube connecting the front and rear end parts, a piston moveable in the cylinder tube and a piston rod secured to the piston and extending through the front end part, at least one of said front and rear end parts including a shoulder which bears against the inner surface of an overlying respective end portion of the cylinder tube and at least one compression ring having been compressed, for plastical deformation resulting in increased length axially around the respective end portion of the cylinder tube thereby to clamp the cylinder tube to the respective at least one end part, the or each compression ring being provided with a flange which is shaped whereby during the said compression of the compression ring the cylinder tube end portion is deformed by the flange and the deformed cylinder tube end portion is clamped between the flange and the shoulder.

2. A working cylinder as claimed in claim 1, wherein both the front end part and the rear end part of the cylinder unit include a respective shoulder for engagement with a respective compression ring via a respective end portion of the cylinder tube.

3. A working cylinder as claimed in claim 1, wherein the surface of the cylinder end part abutting the deformed cylinder tube end portion is provided with at least one recess for receiving deformed cylinder tube material.

4. A working cylinder as claimed in claim 1, wherein the front end part includes a shoulder as aforesaid and a front compression ring clamps a front cylinder tube end portion to the front end part, and wherein an annular gap is provided between the piston rod and the front end part of the cylinder unit in a location radially inwardly of the front compression ring.

5. A working cylinder as claimed in claim 1, wherein said at least one end part of the cylinder unit has a stop for abutment against a respective edge of the respective compression ring for the elimination of axial displacement of the cylinder tube when the compression ring is fitted on.

6. A working cylinder as claimed in claim 5, wherein a radially inner portion of the stop is bevelled towards the respective end portion of the cylinder tube.

7. A working cylinder as claimed in claim 6, wherein the edge of the compression ring has a bevelled surface for cooperation with the bevelled portion of the stop.

8. A working cylinder as claimed in claim 1, wherein said shoulder has an edge over which the interior surface of the cylinder tube is deformed.

9. A working cylinder as claimed in claim 1, wherein the flange of the compression ring is arranged to extend over the end of the cylinder tube.

10. A working cylinder as claimed in claim 9, wherein the flange extends over the end of the cylinder tube as far as the interior surface of the cylinder tube and has a radially inwardly directed bevelled surface.

11. A working cylinder as claimed in claim 1, wherein the piston rod is constituted by a tube and further comprising first and second insert parts, each of which has a respective shoulder which bears against the inner surface of, respectively, an overlying inner and outer end portion of the piston rod tube, each of the first and second insert parts being fitted to a respective end of the piston rod tube, the piston including a deformed end which has been compressed thereby to deform the inner end portion of the piston rod tube thereby to clamp the inner end portion between the deformed end and the first insert and secure the piston to the piston rod tube, and the outer end portion of the piston rod tube being secured to the second insert part by means of a second compression ring having a flange which clamps the outer end portion of the piston rod tube onto the shoulder of the second insert part.

12. A working cylinder as claimed in claim 11, wherein that surface of the deformed end of the piston which abuts the piston rod tube is provided with a series of spaced gripping means for enhancing the clamping grip between said deformed end and the piston rod tube.

13. A working cylinder as claimed in claim 11, wherein that surface of the first insert piece which abuts the piston rod tube is provided with a series of spaced gripping means.

14. A method for mounting at least one compression ring which connects the cylinder tube with a respective cylinder end, in a working cylinder as claimed in any one of the preceding claims, the method comprising compressing in a first step that part of the compression ring which radially surrounds the cylinder tube at the shoulder of the cylinder end part and compressing in a second step the flange of the compression ring.

15. A method as claimed in claim 14, wherein an elastic ring element is positioned between the compression tool and the cylinder tube during the compression.

* * * * *